US008584336B2

(12) United States Patent
Coray

(10) Patent No.: US 8,584,336 B2
(45) Date of Patent: Nov. 19, 2013

(54) LINER BOLT AND REMOVAL APPARATUS THEREFOR

(71) Applicant: Dale Coray, Malahat (CA)

(72) Inventor: Dale Coray, Malahat (CA)

( * ) Notice: Subject to any disclaimer, the term of this patent is extended or adjusted under 35 U.S.C. 154(b) by 0 days.

(21) Appl. No.: 13/656,161

(22) Filed: Oct. 19, 2012

(65) Prior Publication Data

US 2013/0042455 A1 Feb. 21, 2013

Related U.S. Application Data

(63) Continuation of application No. 11/994,012, filed as application No. PCT/AU2006/000898 on Jun. 26, 2006, now abandoned.

(30) Foreign Application Priority Data

Jun. 27, 2005 (AU) ................................ 2005903391

(51) Int. Cl.
*B23P 19/04* (2006.01)

(52) U.S. Cl.
USPC ............................................................ 29/254

(58) Field of Classification Search
USPC ..................... 29/254; 411/395, 424, 381, 382
See application file for complete search history.

(56) References Cited

U.S. PATENT DOCUMENTS

| | | | | |
|---|---|---|---|---|
| 3,145,750 A | | 8/1964 | Wootton | |
| 4,805,495 A | | 2/1989 | Tauber | |
| 4,824,314 A | * | 4/1989 | Stencel | 411/378 |
| 6,430,756 B1 | * | 8/2002 | Reilly | 4/252.1 |
| 2003/0219328 A1 | | 11/2003 | Schultz | |
| 2004/0028500 A1 | | 2/2004 | Monserratt et al. | |
| 2004/0140113 A1 | | 7/2004 | Rubie | |
| 2005/0002754 A1 | * | 1/2005 | Schultz | 411/378 |

FOREIGN PATENT DOCUMENTS

| | | |
|---|---|---|
| FR | 2556058 A1 | 6/1985 |
| WO | 9726116 A1 | 7/1997 |

OTHER PUBLICATIONS

Austrialian Patent Office, International Search Report, dated Jul. 25, 2006, for PCT/AU2006/000898.

* cited by examiner

*Primary Examiner* — Lee D Wilson
*Assistant Examiner* — Jamal Daniel
(74) *Attorney, Agent, or Firm* — Design IP

(57) ABSTRACT

A liner bolt (1) for securing a liner to a mill, the liner bolt (1) comprising a head (3) and a shank (4) extending therefrom, the shank (4) having an external thread thereon, and having a bore (5) therein extending from its free end. A removal pin (2) is adapted to be inserted into bore (5) when liner bolt (1) is to be removed from the mill. Removal pin (2) is adapted to be struck by a moil (14).

12 Claims, 10 Drawing Sheets

LINER BOLT AND REMOVAL APPARATUS THEREFOR

CROSS REFERENCE TO RELATED APPLICATIONS

This application is a continuation of U.S. patent application Ser. No. 11/994,012, which is the National Stage of International Application No. PCT/AU06/00898, filed Jun. 26, 2006, both of which are incorporated herein by reference as if fully set forth.

TECHNICAL FIELD

The present invention relates to liner bolts and an apparatus for removing the same from mills. In particular, the apparatus is an adaptor that can be fitted to a liner bolt removal tool for removal of such liner bolts.

BACKGROUND

Liner bolts are typically used to secure sacrificial liners to the internal casing of mills used in the mining industry. The sacrificial liners are routinely replaced during maintenance of the mills. Typically such mills may range in size from three meters to eleven meters in diameter and are lined with replaceable heavy steel segments attached internally to the mill casing by through bolting using liner bolts. The liner bolts typically have a diameter of up to about 50 mm (2 inches).

In such applications, the bolts become corroded and clearances between bolts and holes become compacted with ore fines. This results in difficult bolt removal at liner removal time. As a result the many liner bolts that are utilized to attach the liners to the mill shell are often required to be freed manually by the use of large sledge-hammers. This is a difficult and time-consuming task that may result in injury to the workers.

While it is well known to use percussive devices such as jack-hammers and hydraulically powered hammers to provide repetitive impacts for many applications, they are not able to be manually guided into alignment with wall mounted bolts and other components. The applications of jack hammers are limited as the hammering effect produced by an electrically or pneumatically operated jack hammer does not provide the impact as would be provided by a sledge hammer, for example.

In known hammering devices capable of delivering such impacts, a high reaction force is produced which necessitates that such devices be carried by articulating machines or be rigidly attached to some support structure. This reduces their versatility and makes them unsuitable for many applications. Furthermore, it is difficult to quickly and accurately align such devices with the shank of a bolt or the like for effecting ready removal thereof.

International publication WO97/26116 (Russell Mineral Equipment Pty Ltd) describes a hydraulic liner bolt removal tool. The hydraulic tool essentially comprises a housing having a moil mounted at the forward end and a hydraulic piston assembly reciprocally moveable along the hammer axis between a striking position at which the piston assembly strikes the impact delivery member and a retracted position remote from the impact delivery member. A firing means is provided for hydraulically firing the piston assembly from its retracted position to its striking position under the control of actuating means. A reactive body assembly is moveable in the direction of the hammer axis by driving means towards the impact delivery member prior to operation of the firing means whereby the reactive body assembly may be energized by movement and subsequently decelerated to substantially absorb the reaction generated by firing the piston assembly. Recoil is thus reduced whereby the apparatus may be operated by hand with the apparatus being suspended about its centre of gravity at the work site.

U.S. Pat. No. 6,904,980 (Rubie) describes a pneumatic liner bolt removal tool that is operable from a conventional compressed air supply.

A disadvantage associated with using such prior art liner bolt removal tools to remove conventional liner bolts, is that it is necessary for the operator of the removal tool be assisted by a workman who helps align the moil of the removal tool with the liner bolt. This is because even though the removal tools are suspended, their size and weight makes them difficult to handle and they obstruct the operator's view of the work area. The workman assisting the operator typically utilizes a handheld moil guide as shown in FIG. 1 of this specification. This places the workman assisting the operator of the liner bolt removal tool at risk of injury, due to his proximity to the working end of the tool as it is aligned with the liner bolt.

Another disadvantage of removing liner bolts using these liner bolt removal tools is the damage caused to the mill casing in the area around the bolt hole, as a result of misalignment.

The present invention seeks to overcome at least some of the abovementioned disadvantages.

SUMMARY OF INVENTION

According to a first aspect the present invention consists of a liner bolt for securing a liner to a mill, said liner bolt comprising a head and a shank extending therefrom, said shank having an external thread thereon, characterized in that said shank having a bore therein extending from its free end.

Preferably in use, when said liner bolt is to be removed from said mill in a first embodiment, a removal pin is inserted into said bore.

Preferably in use, said removal pin in is adapted to be struck by a moil.

Preferably, said moil is operably mounted to a liner bolt removal tool.

Preferably, said moil is housed within an adaptor mounted to said liner bolt removal tool, and said adaptor is adapted to slidably engage with said pin.

Preferably, when said liner bolt is to be removed from said mill in a second embodiment, a moil is adapted to be inserted into said bore.

According to a second aspect the present invention consists of a hammer adaptor for a liner bolt removal tool, said adaptor adapted to be fitted to said tool in such a manner to shroud said moil, said adaptor slidably engagable with a liner bolt and a removal pin, said liner bolt comprising a shank having a bore therein and said removal pin adapted to be seated within said bore, said adaptor to guide said moil into striking engagement with said pin.

Preferably, said hammer adaptor is length variable.

Preferably, said hammer adaptor comprises a first tubular member spring loaded in a telescopic arrangement with a second tubular member.

According to a third aspect the present invention consists of a removal pin in combination with a predetermined liner bolt, said predetermined liner bolt comprising a head and a shank extending therefrom, said shank having an external thread thereon, and said shank having a bore therein extending from its free end, said removal pin having a first end adapted to be inserted into said bore of said liner bolt, and a second end adapted to be struck by a tool when said removal pin is in engagement with said liner bolt.

According to a fourth aspect the present invention consists of a liner bolt for securing a liner to a mill, said liner bolt comprising a head and a shank extending therefrom, said shank having an external thread thereon, said shank being of length such that when said bolt is secured to said mill, a substantial portion of said shank protrudes from said mill, thereby allowing a hammer adaptor for a liner bolt removal tool to slidably engage with said shank.

Preferably, said hammer adaptor is length variable.

Preferably, said hammer adaptor comprises a first tubular member spring loaded in a telescopic arrangement with a second tubular member.

BRIEF DESCRIPTION OF THE DRAWINGS

In order that this invention may be more readily understood and put into practical effect, reference will now be made to the accompanying drawings which illustrate a typical embodiment of the invention and wherein.

DETAILED DESCRIPTION OF THE PREFERRED EMBODIMENTS

The term "comprising" (and its grammatical variations) as used herein is used in the inclusive sense of "having" or "including" and not in the exclusive sense of "consisting only of".

In the claims, letters are used to identify claimed steps (e.g., (a), (b), and (c)). These letters are used to aid in referring to the method steps and are not intended to indicate the order in which claimed steps are performed, unless and only to the extent that such order is specifically recited in the claims.

Figure 1:
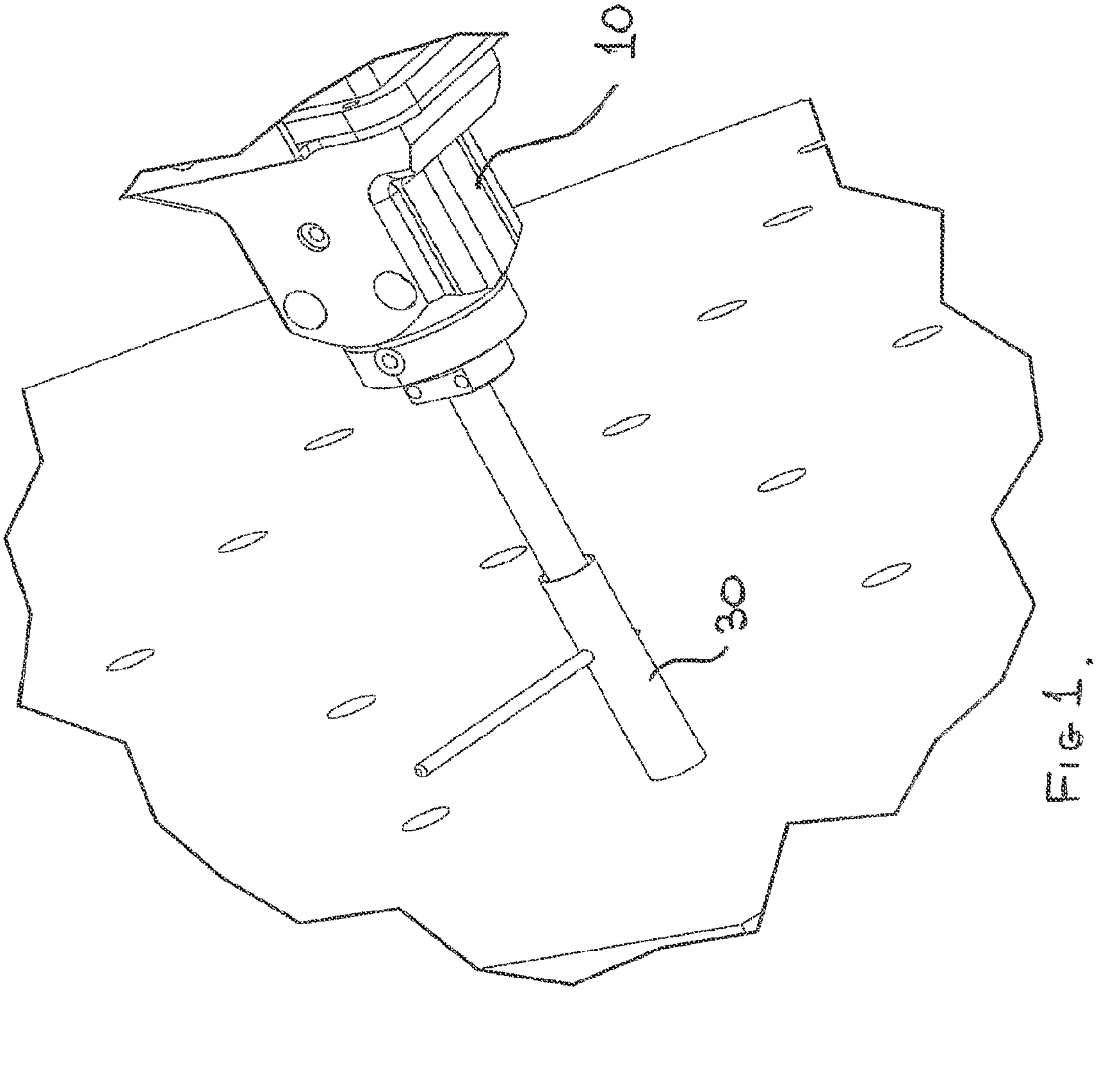
FIG. 1 is a partial perspective view of prior art liner bolt removal tool being used with a prior art hand-held guide to remove a prior art liner bolt.

FIG. 1 is a prior art liner bolt removal tool 10 that utilizes a hand-held moil guide 30 to remove a conventional liner bolt from a liner secured to a mill casing.

Figure 2:
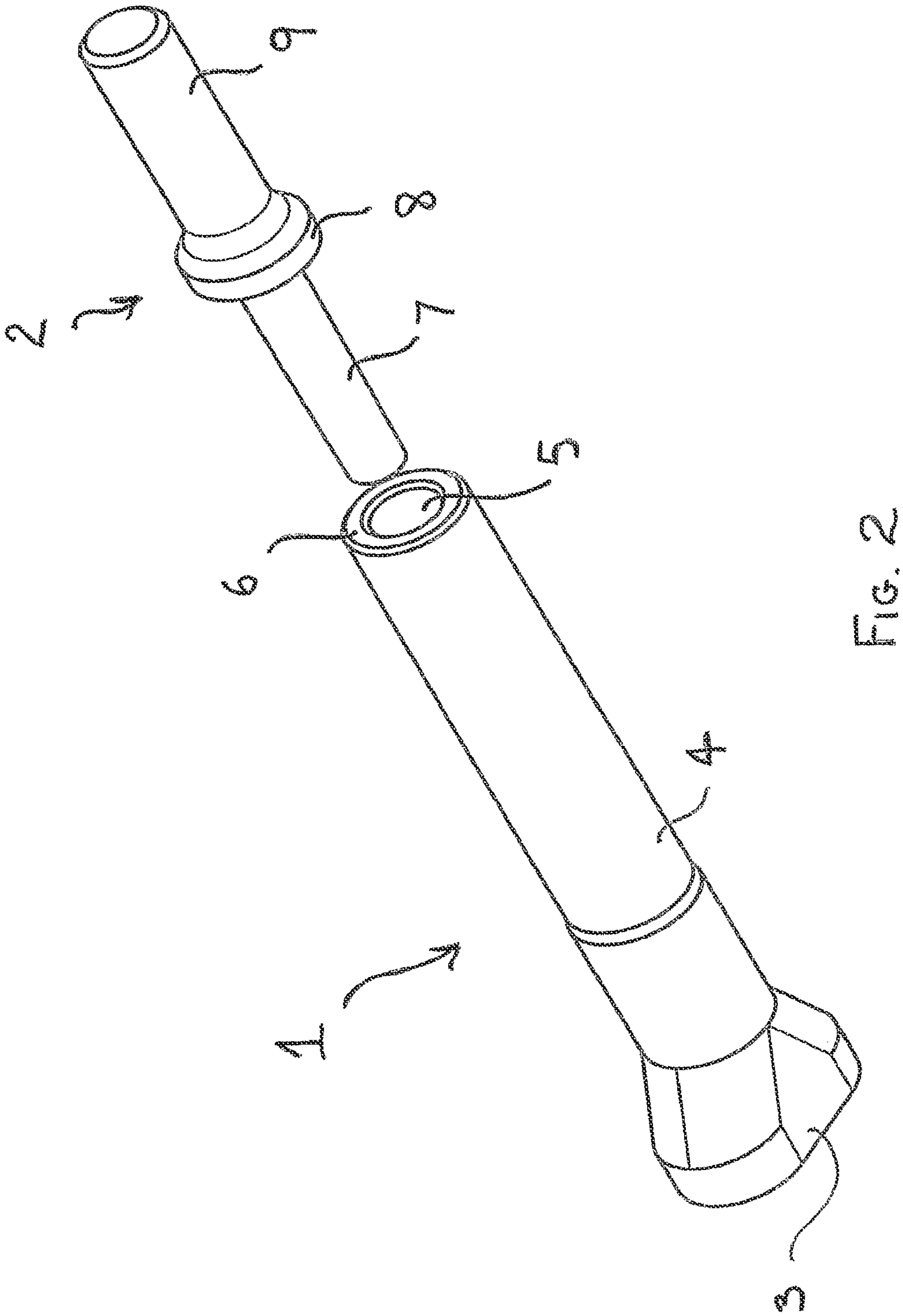
FIG. 2 is a perspective view of a liner bolt and a removal pin therefor in accordance with a first embodiment of the present invention.
Figure 3:
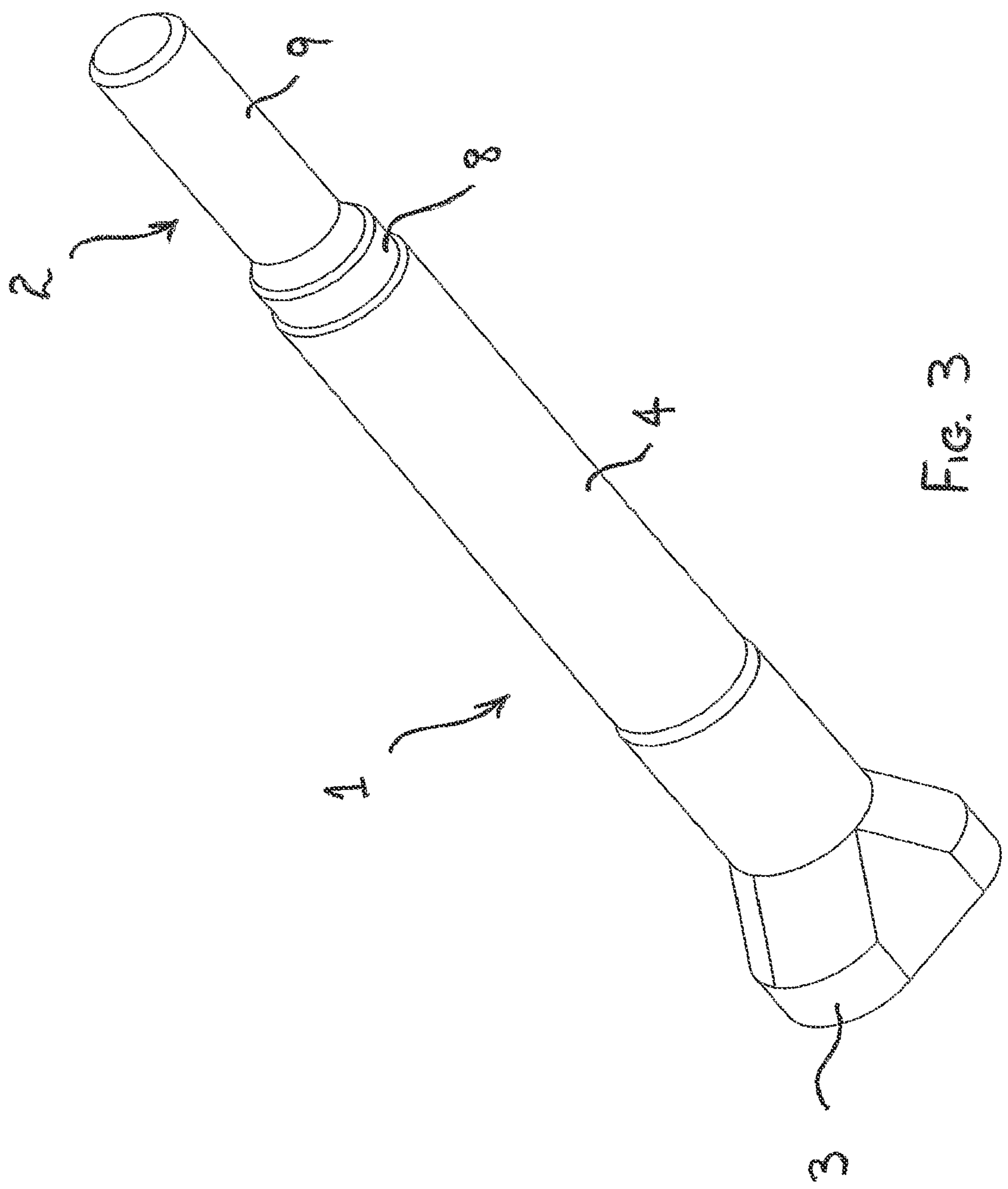
FIG. 3 is a perspective view of the liner bolt of FIG. 2, with the removal pin engaged therewith.

FIGS. 2 and 3 depict a liner bolt 1 and a removal pin (drifter) 2 in accordance with a first embodiment of the present invention. Liner bolt 1 is adapted for securing a sacrificial liner to the internal casing of a mill used in the mining industry.

Liner bolt 1 comprises an oval shaped head 3 and a shank 4 extending therefrom. Shank 4 is preferably threaded in a conventional manner to allow a fastening nut (not shown) to engage therewith. Liner bolt 1 also comprises a bore 5 that extends into shank 4 a short distance from its free end 6. Liner bolt 1 is made of a similar material used for conventional liner bolts.

Removal pin 2 comprises a first cylindrical end 7, a central portion 8 and a second cylindrical end 9. The first cylindrical end 7 has a diameter smaller than the second cylindrical end 9. Central portion 8 has a diameter substantially greater than both first and second ends 7,9. Central portion 8 also has a flat face facing the direction to which the first cylindrical end 7 extends. Pin 2 is preferably made of a substantially hardened material and is reusable.

In use, liner bolt 1 secures a liner to a mill casing in a conventional manner, with the head 3 of liner bolt 1 located internally and shank 4 projecting externally of the mill casing. In order to remove the liner bolt 4, the second cylindrical end 7 of pin 2 is fully inserted into bore 5 such that the flat face of central portion 8 abuts against the free end 6 of shank 4. In order to remove the liner bolt 1, the second cylindrical end 9 of pin 8 is preferably struck by the moil of a hammer.

The liner bolt 1 may be made in sizes to replace conventional liner bolts. In one particular size, the liner bolt 1 may have a shank 4 with a diameter of about 45 mm, and an overall length of about 300-350 mm. This size bolt may have a bore 5 of about 25 mm diameter and about 75 mm in length.

Figure 4:
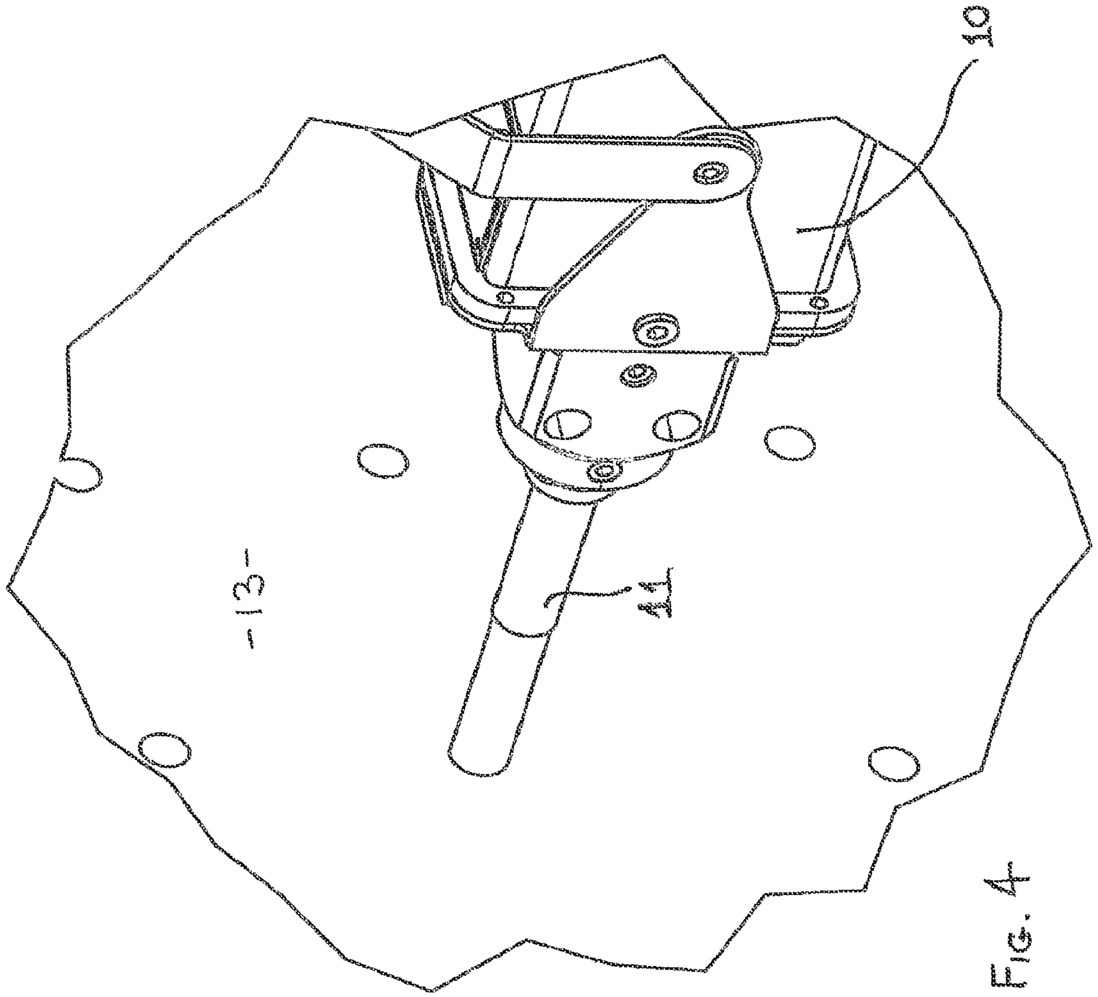
FIG. 4 is a partial perspective view of a liner bolt removal tool fitted with an adaptor for removal of a liner bolt of the type shown in FIG. 1.
Figure 5:
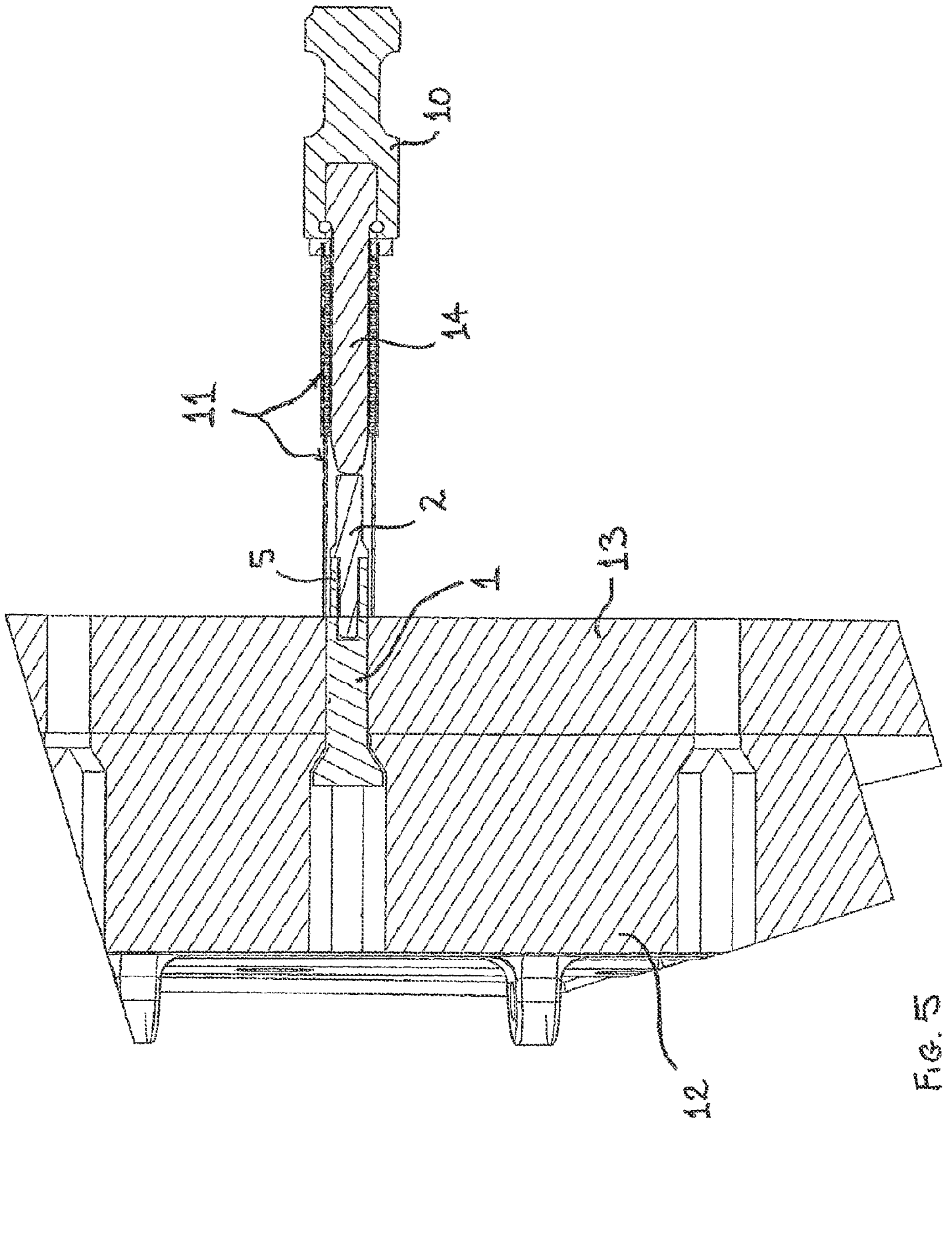
FIG. 5 is a partial cross-sectional view of the liner bolt removal tool and adaptor shown in FIG. 4 set up to remove the liner bolt.
Figure 6:
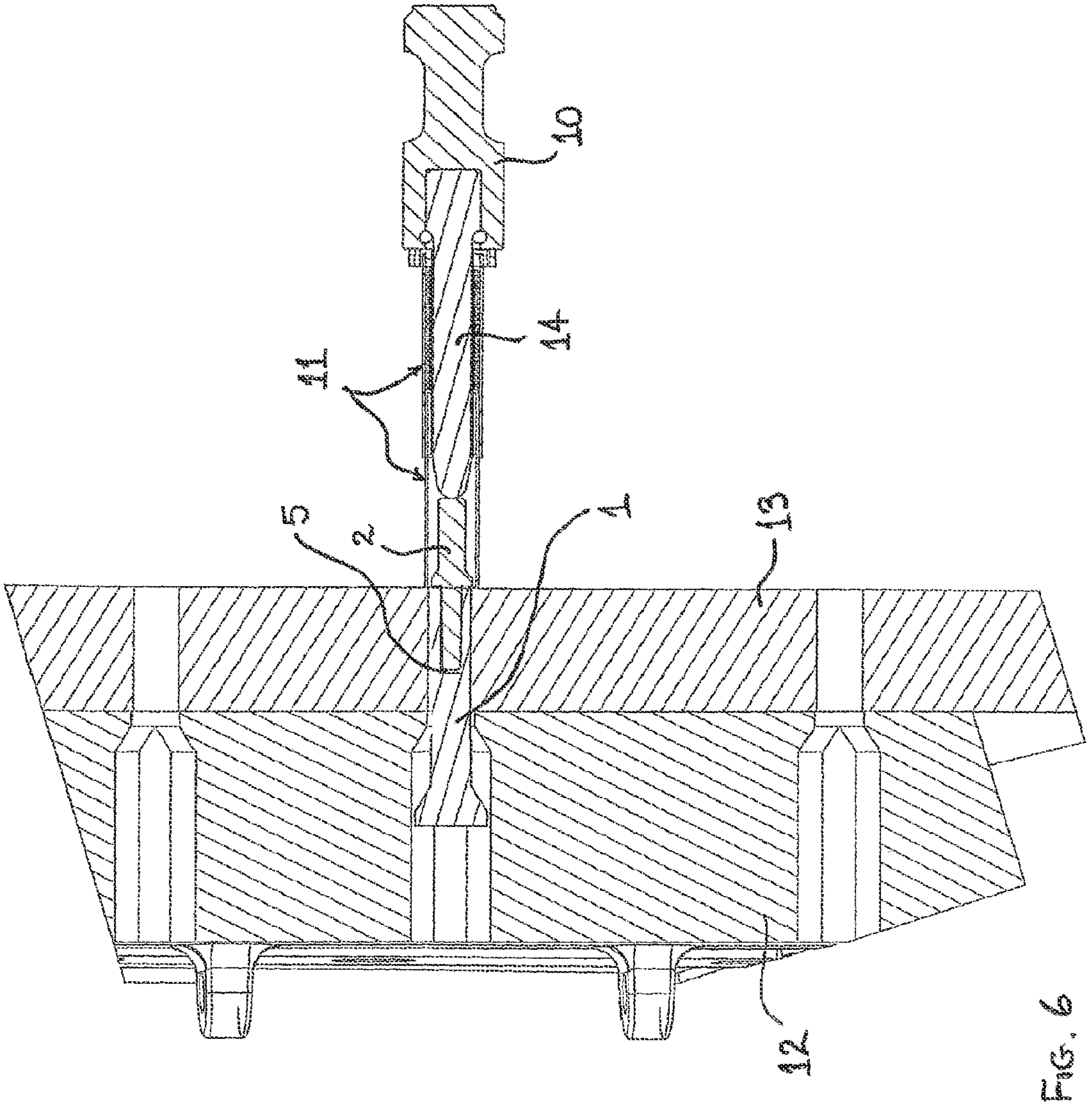
FIG. 6 is a partial cross-sectional view of the liner bolt removal tool and adaptor shown in FIG. 4 as the liner bolt is being removed.

FIGS. 4, 5 and 6 depict a conventional liner bolt removal tool 10 fitted with a hammer adaptor 11 used to remove liner bolt 1 from a liner 12 and mill casing 13, via removal pin 2. Adaptor 11, which has a spring-loaded telescopic arrangement, is fitted to tool 10 with moil 14 extending therethrough.

As can be seen in FIG. 5, pin 2 is inserted into bore 5 of liner bolt 1. The free end of adaptor 11 is slid onto the shank 4 of liner bolt 1, such that the fore end of moil 14 of tool 10 is in contact with second cylindrical end 9 of pin 2. Once the adaptor 11 is in place, the tool 11 does not require additional operator guidance. In use, tool 10 is activated by the operator (not shown), and moil 14 strikes pin 2, which in turn urges both pin 2 and liner bolt 1 from liner 12 and mill casing 13. Also, the pin 2 can be recovered and re-used.

Figure 7:
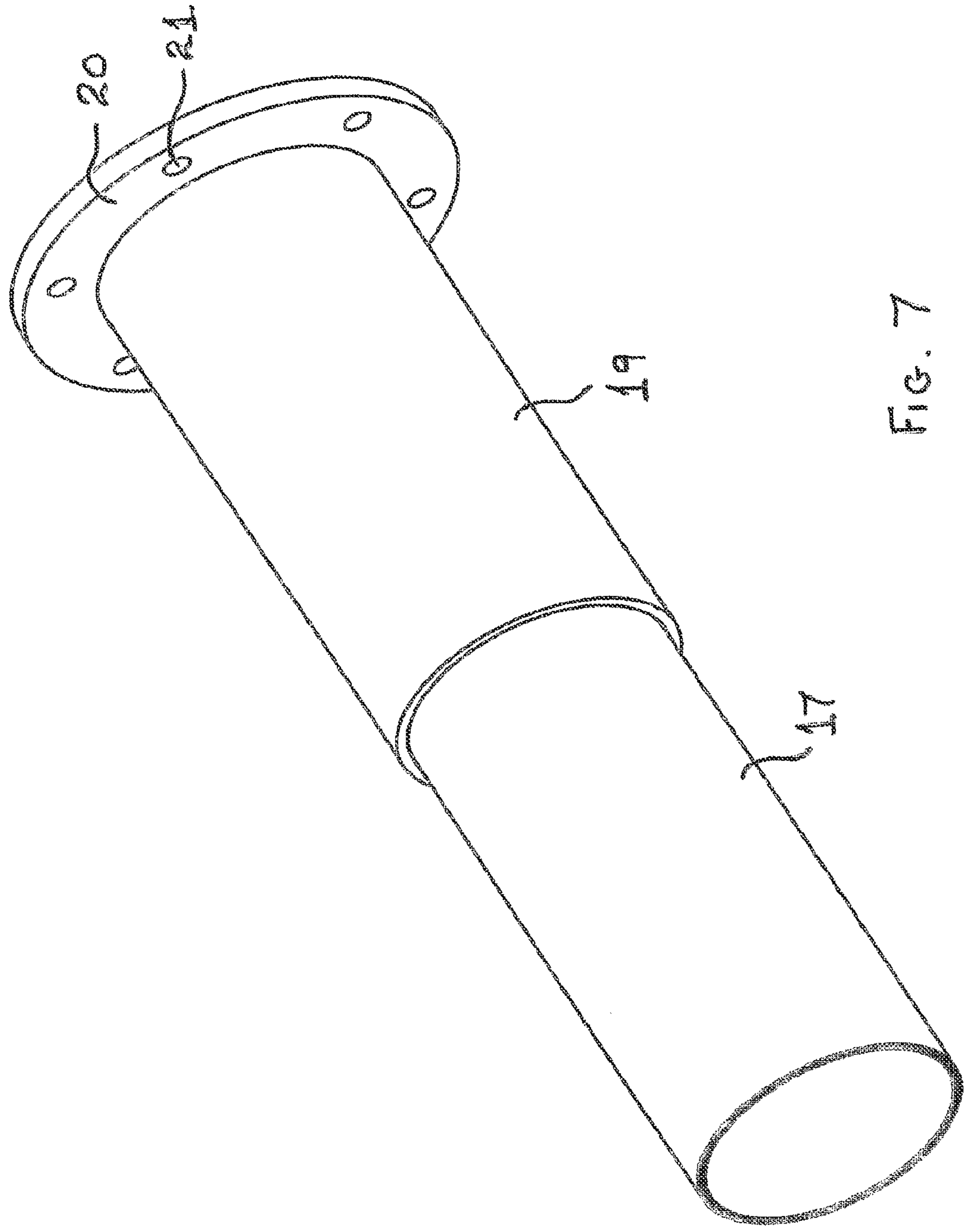
FIG. 7 is a perspective view of the adaptor shown in FIG. 4.
Figure 8:
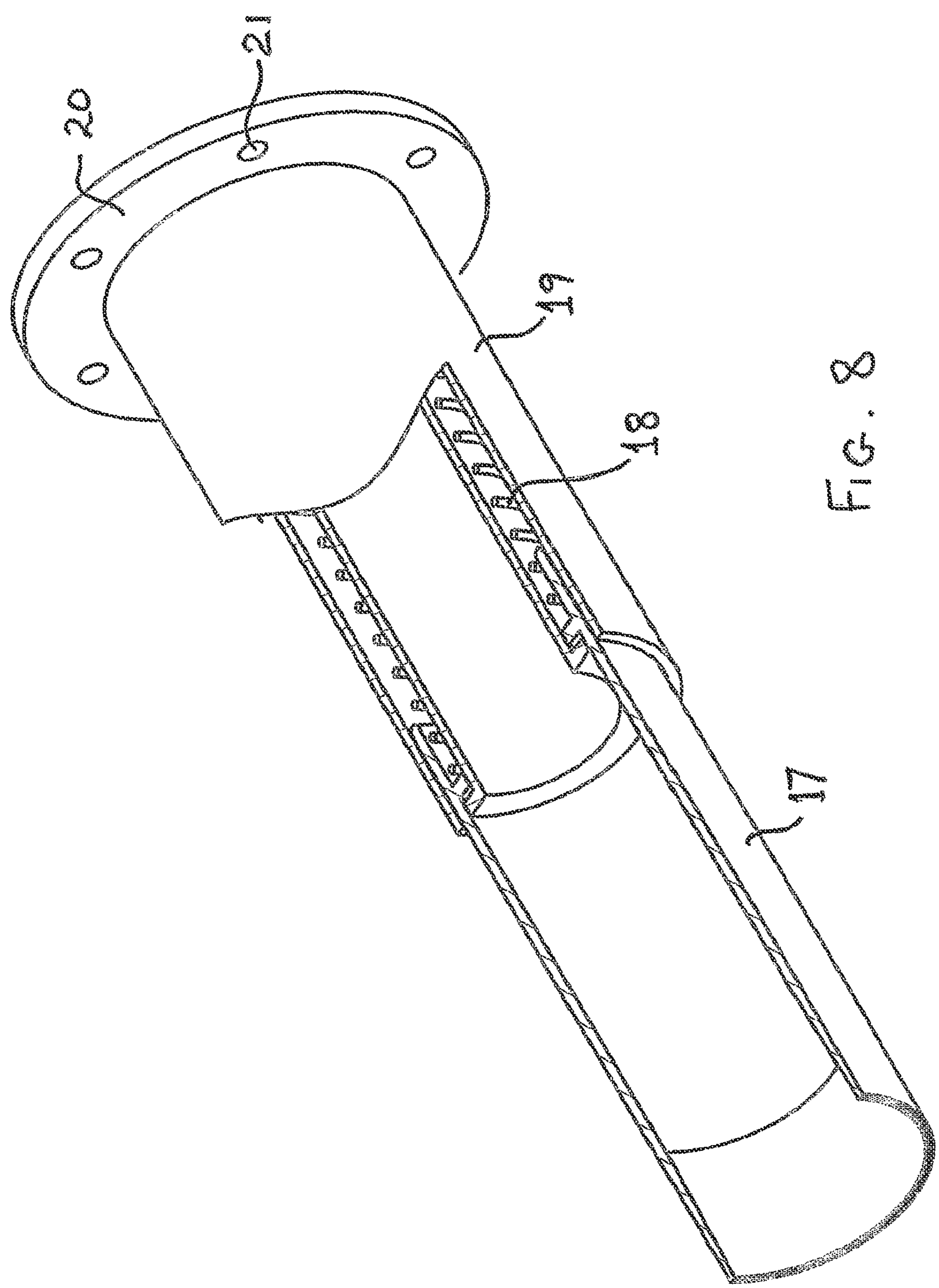
FIG. 8 is a cut-away perspective view of the adaptor shown in FIG. 7.

FIGS. 7 and 8 depict hammer adaptor 11. The hammer adaptor 11 comprises a first tubular member 17 spring loaded by spring 18 in a telescopic arrangement with a second tubular member 19. A flange 20 having apertures 21, extends from an end of second tubular member 19. The flange 20 allows adaptor 11 to be connected to a conventional liner bolt removal tool 10. Second tubular member 19 is fixed relative to tool 10, however during operation, as the tool 10 is fired, the overall length of adaptor 11 is variable as first tubular member 17 slides relative to the second tubular member 19.

Figure 9:
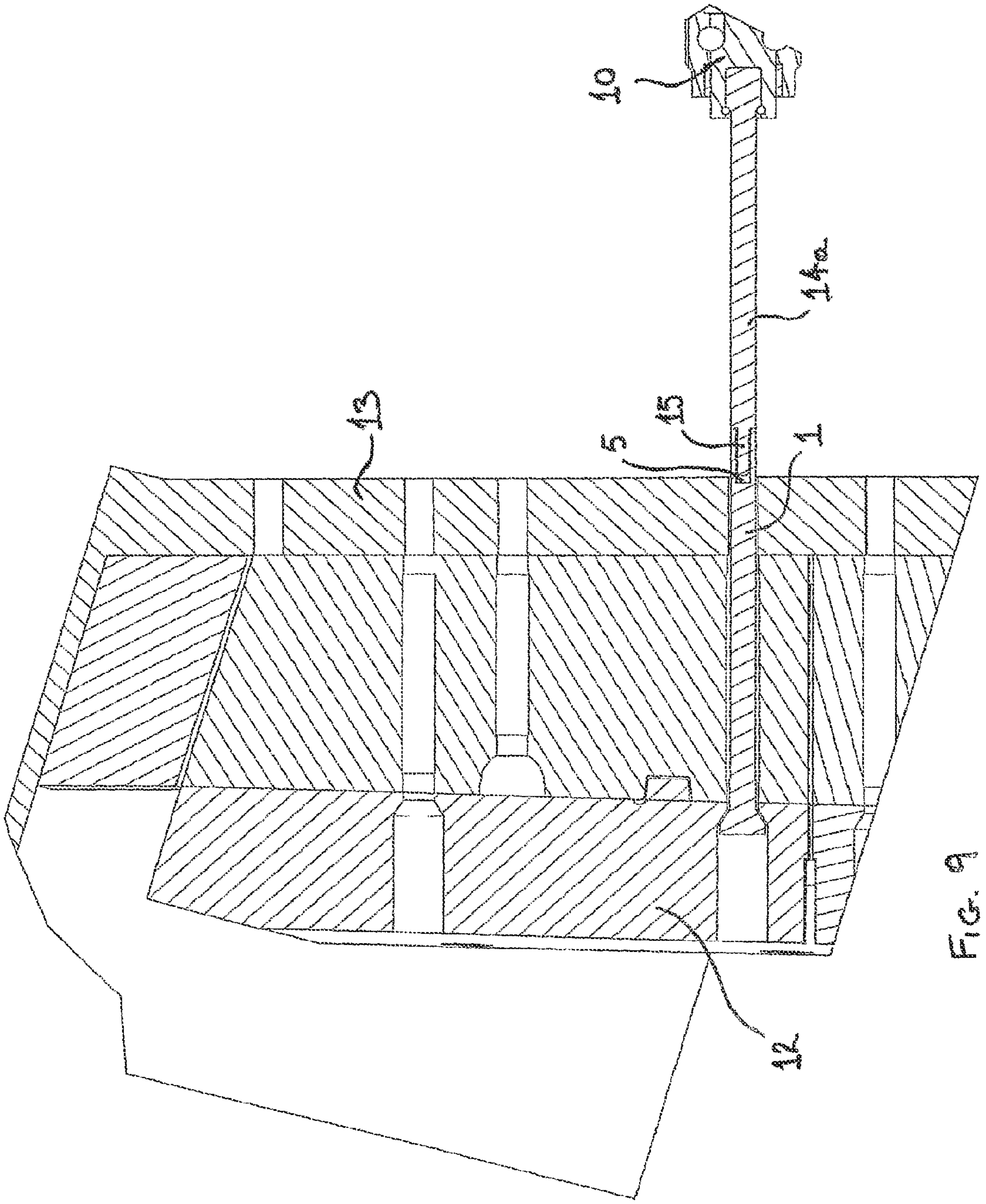
FIG. 9 is a partial cross-sectional view of an alternative embodiment of a moil set up to remove a liner bolt of the type shown in FIG. 1.

In an alternative embodiment as shown in FIG. 9, particularly suited to where it is difficult to use a pin 2, a special purpose moil **14*a* may have a pin end 15 adapted to engage directly with bore 5 of liner bolt 1**.

Figure 10:
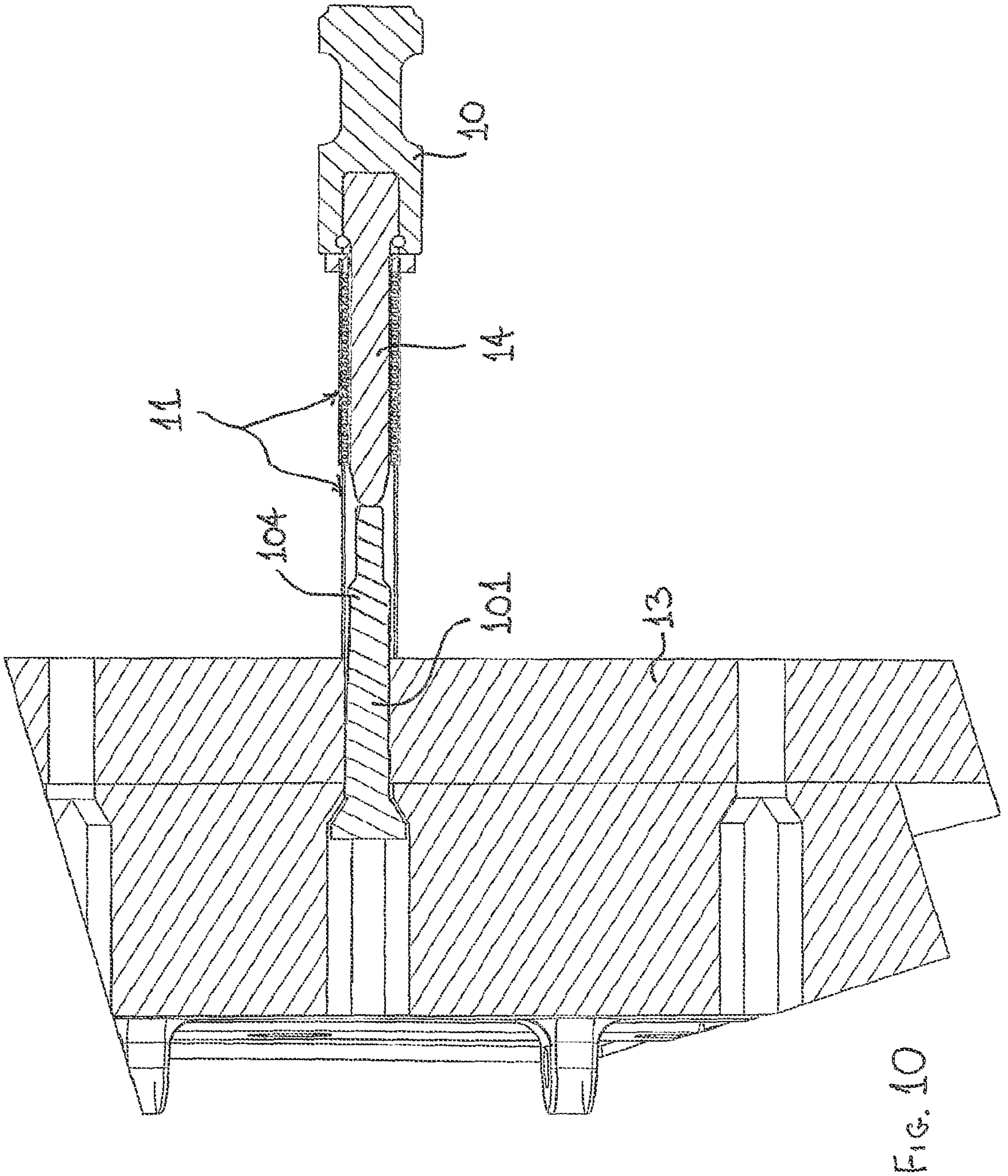
FIG. 10 is a partial cross-sectional view of a liner bolt in accordance with a second embodiment of the present invention.

FIG. 10 depicts a liner bolt 101 in accordance with a second embodiment of the present invention. Liner bolt 101, is in effect as if the liner bolt 1 and pin 2 as shown in FIG. 5 are integrated together to form bolt 101 having a shank 104.

This shank 104 has an external thread thereon, thereby allowing it to be secured to mill casing 13 in a like manner to bolt 1 shown in FIG. 5. However, in this embodiment the free end of shank 104 extends a substantial length externally of the mill, thereby allowing the hammer adaptor 11 to slidably engage therewith. The hammer adaptor 11 being fitted to a tool 10 carrying a moil 14, similar to that shown in the first embodiment.

Removal of the liner bolts 1 as described in the abovementioned embodiments not only minimizes the risk of injury to workers, but may result in the actual knock out times being reduced by 40-60%, which is a considerable saving of downtime. Another advantage of liner bolt 1 and removal pin 2 is that their use significantly reduces risk of damaging the area around the bolt hole.

The invention claimed is:

1. A method of removing a liner bolt having a head and a shank from an ore processing mill in which an interior sacrificial liner is bolted to a mill casing, the liner bolt passing through a pair of aligned through holes in the interior sacrificial liner and the mill casing with the head retained within the interior sacrificial liner, the method comprising the steps of:

(a) if necessary, removing a nut exterior to the casing from the shank;

(b) providing a tip of the shank with a blind bore which extends into the shank;

(c) providing a seat extending around the bore at the tip;

(d) providing an inertial tool having a projection shaped to mate with the bore, wherein the inertial tool comprises a hammer adaptor;

(e) bringing the inertial tool into contact with the seat;

(f) inter-engaging the bore and the projection;

(g) providing the tool with at least one impulse directed in the direction from the tip towards the bolt head, to drive the bolt out of the casing, and (h) telescopically adjusting the length of the hammer adaptor.

2. The method of claim 1, wherein step (b) comprises providing a tip of the shank with a blind bore which is cylindrical and extends into said shank.

3. The method of claim 1, wherein step (d) comprises providing a removal pin having a projection shaped to mate with said bore, wherein the removal pin co-operates with a moil.

4. The method of claim 1, wherein step (d) comprises providing an inertial tool having a projection shaped to mate with said bore, wherein the inertial tool comprises a moil.

5. A method of removing a liner bolt having a head and a shank from an ore processing mill in which an interior sacrificial liner is bolted to a mill casing, wherein the liner bolt extends through a pair of aligned through holes in the interior sacrificial liner and the mill casing with the head of the liner bolt retained within the interior sacrificial liner, the method comprising the steps of:

(a) inserting a projection of an inertial tool into a blind bore at a tip of the shank until a face of the inertial tool abuts a seat of the shank that extends around the blind bore at the tip of the shank;

(b) removing a nut exterior to the mill casing from the shank; and (c) driving the liner bolt out of the aligned through holes in the interior sacrificial liner and the mill casing.

6. The method of claim 5, wherein step (c) comprises:

driving the liner bolt with an impulse in the direction from the tip of the shank towards the head.

7. The method of claim 5, wherein step (a) comprises:

inserting a projection of a removal pin that co-operates with a moil into a blind bore at a tip of the shank until a face of the removal pin abuts a seat of the shank that extends around the blind bore at the tip of the shank.

8. A method for installing a sacrificial liner to a mill casing and later removing it therefrom, the method comprising:

(a) aligning a through hole located in the sacrificial liner with a through hole located in the mill casing, the through hole located in the sacrificial liner extending between an interior surface and an exterior surface thereof and the through hole located in the mill casing extending between an interior surface and an exterior surface thereof;

(b) extending a shank of a liner bolt through the through hole located in the sacrificial liner and through the through hole located in the mill casing so that a head of the liner bolt remains within the through hole located in the sacrificial liner and at least a portion of a free end of the shank that is located opposite the head of the liner bolt extends beyond the exterior surface of the mill casing, the free end of the shank having a blind bore that extends into the shank;

(c) engaging a nut with the free end of the shank of the liner bolt, thereby securing the sacrificial liner to the mill casing;

(d) disengaging the nut from the free end of the shank of the liner bolt;

(e) placing an inertial tool having a projection that is shaped to mate with the blind bore of the free end of the shank in contact with the at least a portion of the free end of the shank that extends beyond the exterior surface of the mill casing so that the inertial tool does not extend into the through hole located in the sacrificial liner; and (f) providing the inertial tool with at least one impulse in a direction along a length of the liner bolt from the free end of the shank towards the head of the liner bolt so that the liner bolt is driven out of the through hole located in the mill casing.

9. The method of claim 8, wherein step (e) further comprises providing an inertial tool that comprises a hammer adaptor.

10. The method of claim 9, wherein step (e) further comprises providing an inertial tool that comprises a hammer adaptor that is telescopically length-adjustable.

11. The method of claim 10, further comprising:

(g) telescopically adjusting the length of the hammer adaptor.

12. The method of claim 8, wherein step (e) further comprises providing an inertial tool that comprises a moil.

* * * * *